United States Patent [19]

Voinescu

[11] 4,158,918
[45] Jun. 26, 1979

[54] ANTI-SHOCK DEVICE FOR DIAL MEASURING INSTRUMENTS

[75] Inventor: Nicolae Voinescu, Lausanne, Switzerland

[73] Assignee: Tesa S.A., Renens, Switzerland

[21] Appl. No.: 883,501

[22] Filed: Mar. 6, 1978

[30] Foreign Application Priority Data

Mar. 24, 1977 [CH] Switzerland .................. 3740/77

[51] Int. Cl.² .................................................. G01B 5/00
[52] U.S. Cl. .................................................. 33/147 R
[58] Field of Search ............ 33/147 R, 147 T, 172 R, 33/DIG. 6, 147 J; 116/129 R

[56] References Cited

U.S. PATENT DOCUMENTS

| 2,336,695 | 12/1943 | Maurer | 33/172 R |
| 3,835,544 | 9/1974 | Schneider | 33/DIG. 6 |
| 4,010,548 | 3/1977 | Iwasaki | 33/172 R |

FOREIGN PATENT DOCUMENTS 489774  6/1970  Switzerland .................. 33/147 J

*Primary Examiner*—Harry N. Haroian
*Attorney, Agent, or Firm*—Anthony J. Casella

[57] ABSTRACT

In a precision dial measuring instrument having a coil-spring shock-absorbing movable unit provided between a pinion and a coaxial gear wheel of the transmission step-up mechanism arranged between the movable indicating member and the feeler of the instrument, the transmission step-up mechanism further includes a system for taking up of play by preliminary elastic stress of its train gear wheels.

8 Claims, 5 Drawing Figures

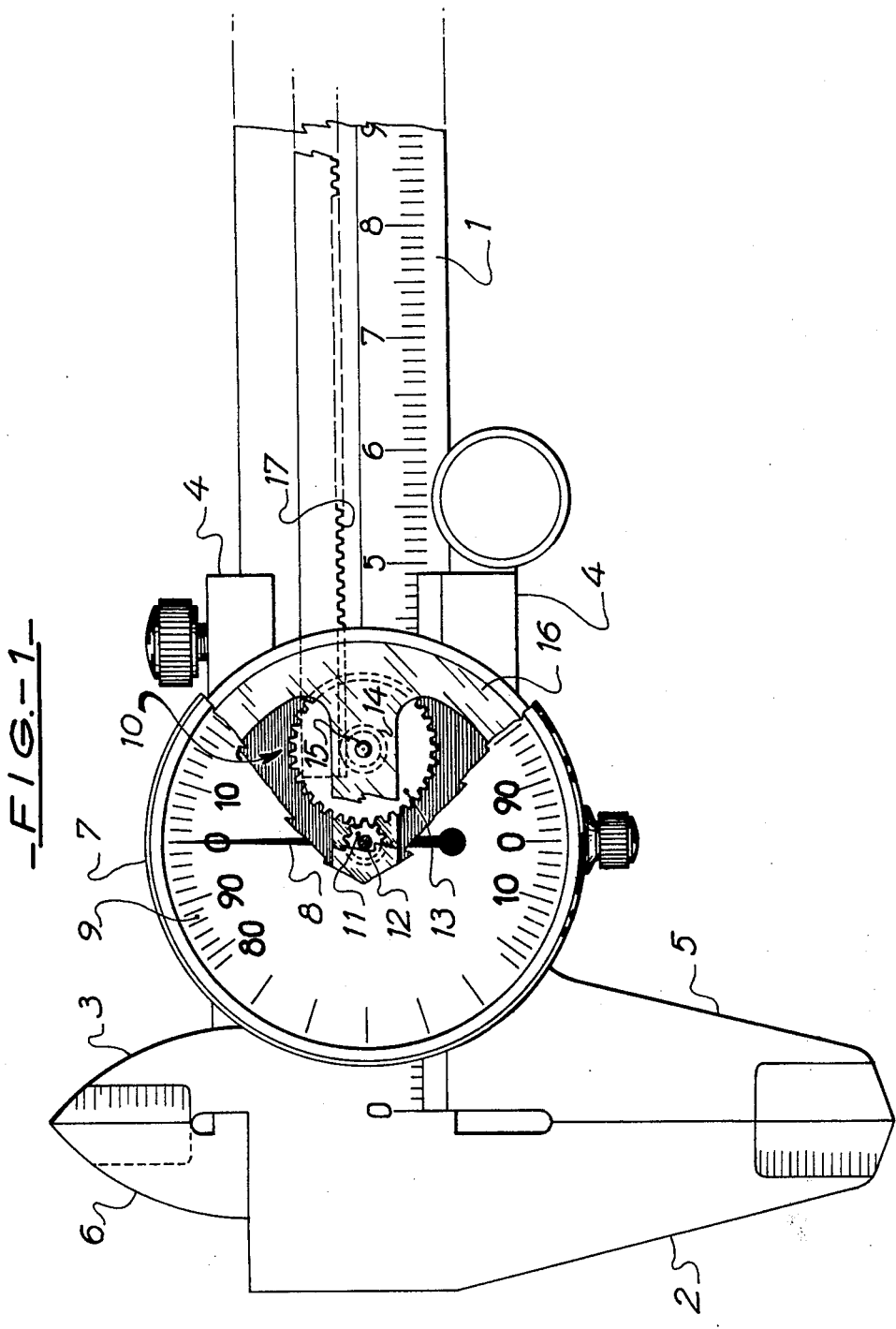

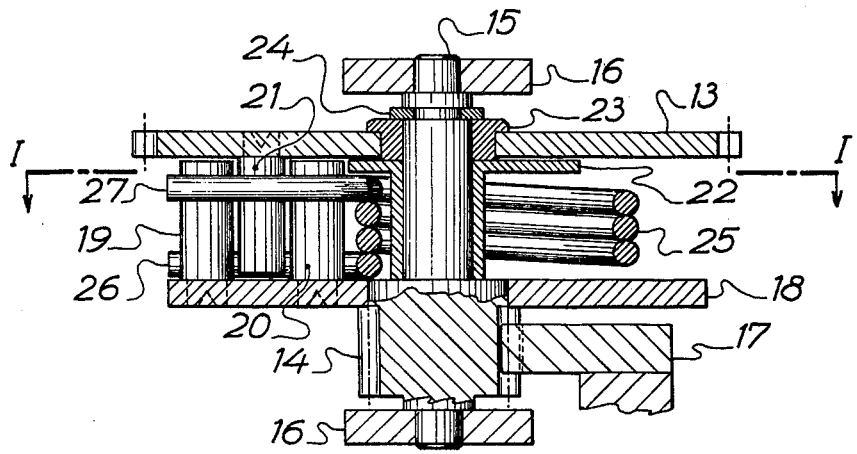
FIG.-2-
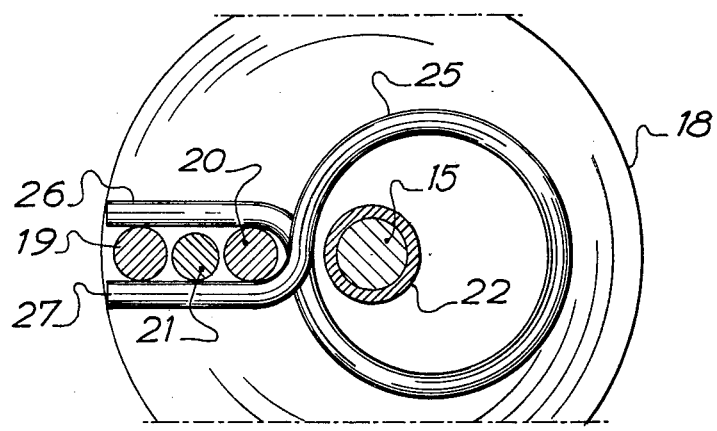
FIG.-3-
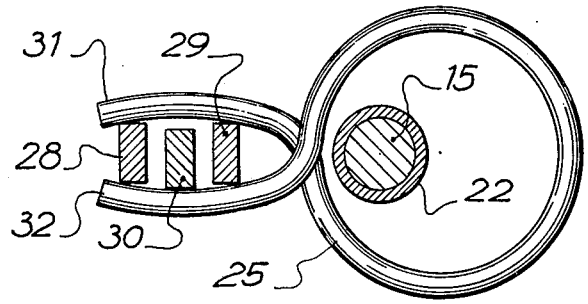
FIG.-4-
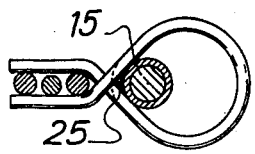
FIG.-5-

ANTI-SHOCK DEVICE FOR DIAL MEASURING INSTRUMENTS

The object of the present invention is an anti-shock device for dial measuring instruments such as comparators, gauges, columns, and marking gauges used in precision mechanics, comprising a coil-spring shock-absorbing movable unit interposed between a pinion and a coaxial gear wheel of the transmission step-up mechanism arranged between the movable indicating member and the feeler of said instruments, in which the said transmission step-up mechanism furthermore comprises a system for the taking up of play by preliminary elastic stress of its train of gear wheels.

Anti-shock devices of this type are known in which the movable shock-absorbing unit comprises two constrained coil springs arranged at an angle of 180° from each other between a disk which is rigidly connected with the pinion and the gear wheel coaxial with said pinion, and in which these springs are compressed and rest both against said disk and said gear in recesses provided opposite each other, or else are stretched and hooked individually at one end to an anchoring point of the disk and at the other end to an anchoring point of the gear.

These anti-shock devices have the advantage of assuring the dampening of the shocks transmitted in both directions of rotation of the said gear wheel and pinion, for instance when the feeler of the measuring instruments with which they are equipped is violently displaced by sudden blows. However, the large angular space which the coil springs occupy between the disk of the pinion and the coaxial gear wheel leaves only a very small shock-absorbing stroke between them, on the order of only a few degrees. The result is that with these coil-spring anti-shock devices it is practically impossible to take up violent shocks resulting, for instance, from the dropping of the instrument, as their shock-absorbing stroke is too small for the maximum permissible power which can be imported to the coil springs used without exceeding the strength of the toothing of the pinions and gears of the step-up transmission mechanisms, these violent shocks being frequently the cause of the breaking of the teeth.

In order to avoid this drawback, the anti-shock device for dial measuring instruments which forms the object of the present invention is characterized by the fact that one of the two toothed elements formed of the said pinion and coaxial gear has two drive fingers arranged at a certain radial distance from each other, by the fact that the other toothed element has a single drive finger arranged between the aforesaid two fingers, and by the fact that it has a coil spring the winding of the turns of which is constrained, the axis of the said winding being substantially parallel to the common axis of rotation of the two toothed elements and the two ends thereof being bent and arranged radially resting against the two drive fingers of the first said toothed element and on opposite sides of them so that the drive finger of the other toothed element is thus connected with the two drive fingers of the first said element by elastic engagement between the said two ends of the coil spring.

One dial measuring instrument equipped with the anti-shock device in accordance with the invention as well as one embodiment of the latter with a variation in its structure is shown in the accompanying drawing.

FIG. 1 is a partial sectional view through the said dial measuring instrument.

FIG. 2 is an axial section on a larger scale through one embodiment of its anti-shock device.

FIG. 3 is a partial top view along the section line 1—1 of FIG. 2.

FIGS. 4 and 5 are variants of the structures shown in FIG. 3.

The measurement instrument shown in FIG. 1 is a dial gauge comprising a body 1 in the form of a graduated rule bearing at its end the customary outer and inner stationary feelers in the form of jaws 2 and 3. Along this body 1 there travels a movable slide 4, also bearing the customary outer and inner movable feelers 5 and 6 in positions opposite the stationary feelers 2 and 3 of the body 1. On the movable slide 4 there is attached the housing of a dial indicator 7 comprising an indicating member 8 mounted for rotation over a graduated dial 9.

The angular displacements of the indicating member 8 are connected to the linear displacements of the movable slide 4 by a transmission step-up mechanism 10 which has the effect of amplifying them with respect to the latter so as to permit the reading of sub-multiples of the graduations of the body 1 on the graduated dial 9.

This transmission step-up mechanism 10 comprises a pinion 11 for the driving of the indicating member 8, mounted on the shaft 12 of the latter and in engagement with a gear wheel 13 mounted coaxially with a pinion 14 on a common shaft 15 supported between the side plates 16 of the housing of the dial indicator 7. The pinion 14 is in engagement with a rack 17 which is rigidly fastened on the body 1 of the instrument. This transmission step-up mechanism 10 furthermore comprises a system for the taking up of play not shown in order not to clutter the drawing of the known type, which acts by elastic pretensioning of its train of gear wheels against the toothing of the rack 17.

The gear wheel 13, which is idly mounted on the shaft 15, is driven by the coaxial pinion 14 via a coil-spring, anti-shock dampening unit placed between them and not visible in FIG. 1, which has the effect of limiting the force of the said drive to a given transmission force corresponding substantially to the elastic limit of the toothing of the gears of the step-up multiplication mechanism, with a certain margin of safety so as to avoid the breaking of teeth to which reference has been had above, with effect in both directions of displacement of the movable feelers 5 and 6 of the slide 4.

One embodiment of this anti-shock device, given by way of example, is shown in FIGS. 2 to 4.

In the axial section of FIG. 2 there can be noted, mounted on their common shaft of rotation 15, the pinion 14 engaged by the rack 17, the gear 13, the shaft 15 turning in two bearings facing the two side plates 16 which hold it between them, all of these parts having already been shown briefly in FIG. 1.

On the shaft 15, which is integral with the pinion 14, a disk 18 is fastened by crimping, on which disk there are attached two drive fingers 19 and 20 which in this case are small cylinders of equal dimensions having their bases crimped in two holes in said disk 18. These two fingers 19 and 20 are arranged radially at a certain distance from each other along a radius of the disk 18, this distance being intended to permit the passage of another drive finger 21 fastened to the gear wheel 13, which in this case also is a small cylinder with base crimped in a hole in said gear 13.

For a reason which will be explained later on, the drive finger 21 of the gear 13 is in this case of slightly smaller diameter than the two drive fingers 19 and 20 of the disk 18 which is rigidly attached to the pinion 14.

On the shaft 15, above the disk 18, there are mounted two tubular spacers 22 and 23 with bearing columns which are held axially by a lock washer 24 locked in a groove in the said shaft 15. Between the collars of these two spacers and on the tubular portion of the spacer 23 the gear wheel 13 is mounted for free rotation.

Between the collar of the spacer 22 and the disk 18 there is mounted a coil spring 25, the axis of winding of the turns thereof being oriented in a position substantially parallel to the common axis of rotation 15 of the pinion 14 and the gear wheel 13.

This coil spring 25, which has been previously formed so as to develop in its position of maximum stress a tensile force which corresponds to the limit value of the maximum force of transmission to which reference was had above, rests radially at its two bent ends 26 and 27 both against the two drive fingers 19 and 20 of the disk 18 which is rigidly attached to the pinion 14 and on both sides of the assembly consisting of these two fingers. This shape of the coil spring 25 is clearly visible from the top view given in FIG. 3 where it will be noted that the drive finger 21 of the gear wheel 13 is thus imprisoned elastically between the two ends 26 and 27 of the coil spring 25 and rests only against one of these ends, in this case the end 27. This resting action is due to the effect of the system for the taking up of play by elastic prestressing of the train of gears of the transmission step-up mechanism of which the gear wheel 13 and the pinion 14 are a part, mention of which has been made above. This effect is utilized here to assure the angular locking of the finger 21 with respect to the fingers 19 and 20 and thus assure the indexing of the measurement instrument by the simultaneous resting of these three fingers against only one of the two ends of the spring 25, in this case the end 27. This effect thus avoids the necessity of a triple resting at the same time against the said two ends of the spring 25, which is practically impossible to obtain, and makes it possible to reduce the diameter of the finger 21 as compared with that of the fingers 19 and 20 so as definitely to avoid any possible play between the two ends 26 and 27 of the spring 25 and the two fingers 19 and 20.

The anti-shcok device described functions in the following manner:

When the slide 4 (FIG. 1) is moved in one direction or the other along the body 1 of the instrument, the pinion 14 which is in engagement with the rack 17 turns and drives with it the disk 18 (FIGS. 2 and 3) to which it is rigidly connected, as well as its two drive fingers 19 and 20. These two fingers communicate their movement of rotation to the two ends 26 and 27 of the coil spring 25 which surround them, driving with them also the drive finger 21 of the gear wheel 13, this finger resting against one of them, the end 27, as explained above. In its turn, the gear wheel 13, driven by its finger 21, transmits its movement of rotation to the pinion 11 (FIG. 1) with which it is in engagement and to the indicating member 8 to which said pinion 11 is connected.

When the slide 4 suffers a violent acceleration or deceleration as a result of a blow or rough handling, the disk 18 turns, driven by the pinion 14, transmitting these phenomena via the anti-shock device described to the assembly formed of the indicating member 8, the pinion 11, and the gear wheel 13, which opposes to these violent impulses a resistance which is all the more greater because its inertia is considerably increased dynamically by the strong step-up ratio of the transmission mechanism.

Under the effect of this strong resistance, the finger 21 which is rigidly connected with the gear wheel 13 tends to remain stationary and the two fingers 19 and 20 which are rigidly connected with the pinion 14 transmitting the violent impulse come free angularly from the finger 21, compressing the coil spring 25 either by action on its end 26 when the impulse is directed in clockwise direction or on its end 27 in counterclockwise direction.

The coil spring 25 which is thus compressed absorbs a great part of the energy before transmitting the movement of rotation to the drive finger 21 of the gear wheel 13, and this absorption can take place over a long angular dampening stroke approaching 300° in the extreme case in which the finger 21 would remain stationary for the entire duration of the acceleration or deceleration, as a result of the inertia of the said assembly.

Immediately after this shock-absorbing period, the coil spring 25 resumes its position bringing about upon its expansion movement the angular bringing together and then the locking of the three drive fingers 19, 20 and 21 in the fork formed by the two ends 26 and 27 of the coil spring 25.

Upon its expansion movement, the coil spring 25 normally resumes its position by the combined effect of radial alignment of its ends 26 and 27 on the two drive fingers 19 and 20 and by the presence, on said alingment and within its turns, of the shaft 15 which forms a stop and prevents the said two ends from sliding along the fingers and escaping.

In order further to facilitate the automatic centering effect of the coil spring upon its expansion movement one may, in a variant, curve the last portion of its two turns directly in front of its two bent ends so as to form an open angle enclosing the shaft 15 in the manner of a chisel, this angle being inscribed within the circle of winding of the turns of the said coil spring. Along this same idea, one can also extend this automatic centering effect by forming an open angle with the entire turns of the coil spring 25, by giving the winding of these turns a pear-shaped form, as shown in FIG. 5, rather than a circular form, or else by imparting it a triangular shape with rounded corners.

The indexing quality of the angular connection of the pinion 14 and the gear wheel 13 depends on the perfect immobilizing of the drive finger 21 of the said gear wheel 13 with respect to the two drive fingers 19 and 20 of the said pinion 14. In order to assure this immobilization it is necessary that the bent ends 26 and 27 of the coil spring between which the drive spring 21 of the gear wheel 13 rests are actually both resting against the two drive fingers 19 and 20 of the pinion 14. For this purpose the bends of these ends of the spring can be imparted a slightly narrower angle, taking into account both the elasticity of this end and the force of the spring so that this double contact is assured under tension of the spring.

One simple means which automatically assures this double contact is indicated in FIG. 4, in which there is furthermore shown another embodiment of the three drive fingers, in this case marked 28, 29, and 30, all three being of the same rectangular cross section, obtained by bending tongues previously cut from the disk 18 and the gear wheel 13 or else attached to same.

This simple means consists in forming the ends of the coil spring, indicated here as 31 and 32, no longer as straight supports like the ends 26 and 27 shown in FIG. 3 but as circular arcs surrounding the two fingers 28 and 29 on their concave faces. Under the effect of the pressure of these two ends around these two fingers the latter move automatically against them in symmetrical positions.

It will be noted in this variant that the curved shape of the two ends of the spring produces between the two drive fingers 28 and 29 of the pinion 14 a larger angular space than at the location of these two fingers, which makes it possible to impart the drive finger 30 of the gear wheel 13 without risk the same width as the other two fingers 28 and 29.

The anti-shock device described has the advantage over the known devices that it requires the use of only a single coil spring and that it assures a long dampening stroke of the order of 300° for violent accelerations or decelerations resulting from blows, doing this by simple means which require no adjustment of precision and assure a perfect indexing of the transmission of movement between movable feeler and indicator member.

Other structural variations of details, not shown, may be provided.

Thus the cylindrical drive fingers of the embodiment shown in FIGS. 2 and 3 may be shaped as tongues, like the fingers shown in the variant of FIG. 4 and conversely, taking into account, however, that in the form shown in FIGS. 2 and 3 the finger 21 must be of a width less than that of the two other fingers which surround it.

The tubular spacer 22 which prevents the coil spring from rubbing against the gear wheel 13 can be eliminated, in a simplified version, since although preferable, it is not indispensable in order to assure the normal operation of the anti-shock device described.

This anti-shock device may be arranged in the transmission step-up mechanism at places other than the one described as preferred contained between the first pinion in engagement with the rack and the first gear wheel driven by said pinion.

Finally, the distribution of the drive fingers on the gear wheel 13 and on the disk 18 which is rigidly connected with the pinion 14 can be reversed without drawback, that is to say the gear wheel 13 can have the two radially spaced fingers and the disk 18 can have the single finger intended to be inserted between the other two.

What is claimed is:

1. Anti-shock device for dial measuring instruments having a gear wheel transmission step-up system arranged between a feeler and a movable indicator member, said step-up system having a first rotating toothed element and a second rotating toothed element coaxial to said first toothed element, comprising:
   (a) a first drive finger mounted on said first toothed element;
   (b) a second drive finger also mounted on said first toothed element, said second drive finger arranged at a certain radial distance apart from said first drive finger;
   (c) a third drive finger mounted on said second toothed element, said third drive finger located between said first and second drive fingers; and
   (d) a coil spring interposed between said first and second toothed elements, said coil spring having the winding of its turn constrained and its axis substantially parallel to the common rotation axis of said first and second toothed elements, said coil spring further having its two ends bent and arranged radially resting against said first and second drive fingers on opposite sides thereof, whereby said third drive finger is connected with said first and second drive fingers by elastic imprisonment between said two ends of said coil spring.

2. Anti-shock device according to claim 1, wherein said two bent ends of said coil spring are rectilinear, wherein said first and second drive fingers have the same width, and wherein said third drive finger has a width slightly less than that of said first and second drive fingers.

3. Anti-shock device according to claim 1, wherein said two bent ends of said coil spring are shaped as circular arcs, the curved inner faces of which are arranged resting on opposite sides against said first and second drive fingers of said first toothed element.

4. Anti-shock device according to claim 3, wherein said first, second, and third drive fingers have the same width.

5. Anti-shock device according to claim 1, wherein said first, second, and third drive fingers are cylindrical.

6. Anti-shock device according to claim 1, wherein said first, second, and third drive fingers are tongues of rectangular cross section.

7. Anti-shock device according to claim 1, wherein the last portion of the two turns of said coil spring directly preceding its two bent ends is curved in such a manner as to form an open angle surrounding said common rotation axis of said first and second toothed elements in the manner of a chisel, this angle being inscribed within the circle of winding of the turns of said coil spring.

8. Anti-shock device according to claim 1, wherein all the turns of said coil spring form an open angle surrounding said common rotation axis of said first and second toothed elements.

* * * * *